(12) United States Patent
Kumagai

(10) Patent No.: US 11,146,971 B2
(45) Date of Patent: Oct. 12, 2021

(54) BASE STATION DEVICE AND BEAM SELECTING METHOD

(71) Applicant: FUJITSU LIMITED, Kawasaki (JP)

(72) Inventor: Shinya Kumagai, Machida (JP)

(73) Assignee: FUJITSU LIMITED, Kawasaki (JP)

( * ) Notice: Subject to any disclaimer, the term of this patent is extended or adjusted under 35 U.S.C. 154(b) by 1 day.

(21) Appl. No.: 16/749,805

(22) Filed: Jan. 22, 2020

(65) Prior Publication Data

US 2020/0275287 A1    Aug. 27, 2020

(30) Foreign Application Priority Data

Feb. 27, 2019  (JP) .............................. JP2019-034455

(51) Int. Cl.
*H04B 7/0413* (2017.01)
*H04W 16/28* (2009.01)
*H04L 5/00* (2006.01)

(52) U.S. Cl.
CPC .......... *H04W 16/28* (2013.01); *H04B 7/0413* (2013.01); *H04L 5/0048* (2013.01)

(58) Field of Classification Search
CPC . H04W 72/042; H04W 72/046; H04W 16/28; H04B 7/0695; H04B 7/088; H04B 7/0626; H04B 17/318; H04B 7/0632; H04B 7/0413; H04B 7/0408; H04B 7/04; H04L 5/0048
See application file for complete search history.

(56) References Cited

U.S. PATENT DOCUMENTS

2016/0345216 A1  11/2016  Kishiyama et al.
2020/0084648 A1*  3/2020  Ramachandra ....... H04W 24/10

FOREIGN PATENT DOCUMENTS

JP   2015-164281 A   9/2015
WO  WO-2018/030819 A1  2/2018

OTHER PUBLICATIONS

Extended European Search Report, from the European Patent Office in counterpart European Application No. 20152814.8, dated Apr. 3, 2020.
XRan.org., XRAN-FH.CUS.0-v02.00, Technical Specification, xRAN Fronthaul Working Group, Control, User and Synchronization Plane Specification, Copyright 2018 xRAN.org, (156 Pages Total), (Jul. 2018).

(Continued)

*Primary Examiner* — Rahel Guarino
(74) *Attorney, Agent, or Firm* — Arent Fox LLP

(57) ABSTRACT

A base station device includes a central unit; and a distributed unit. The distributed unit includes a first processor configured to form beams in plural directions by using plural antenna elements; and transmit and receive a data signal addressed to a terminal device. The central unit includes a second processor configured to select a first beam and a second beam set, by using: relevant information on the beams, the relevant information being notified by the distributed unit that forms the beams; and reception quality of the beams in the terminal device; cause the distributed unit to transmit a reference signal by application of a beam group formed of: one or more beams in the second beam set; and the first beam; and select a beam group to be applied to the data signal, by using a reception state of the reference signal from the terminal device in a predetermined interval.

6 Claims, 10 Drawing Sheets

(56) References Cited

OTHER PUBLICATIONS

XRan.org., XRAN-FH.MP.0-v01.00 Technical Specification, xRAN Fronthaul Working Group Management Plane Specification, Copyright 2018 xRAN.org, (112 Pages Total) (Jul. 2018).
Tateishi, K. et al., "5G Experimental Trial Achieving Over 20 Gbps Using Advanced Multi-antenna Solutions", 2016 IEEE 84th Vehicular Technology Conference (VTC-Fall), Montreal, Canada, (5 Pages Total), (Sep. 2016).

* cited by examiner

| BEAM ID | BEAM STATE | ADJACENT BEAM ID |
|---|---|---|
| #1 | NARROW | #2 |
| #2 | GOOD | #1 |
| #3 | GOOD | #1, 4 |
| #4 | GOOD | #3 |

BASE STATION DEVICE AND BEAM SELECTING METHOD

CROSS-REFERENCE TO RELATED APPLICATION

This application is based upon and claims the benefit of priority of the prior Japanese Patent Application No. 2019-034455, filed on Feb. 27, 2019, the entire contents of which are incorporated herein by reference.

FIELD

The embodiments discussed herein are related to a base station device and a beam selecting method.

BACKGROUND

Massive MIMO technology where a base station is assumed to have, for example, several hundreds to several thousands of antenna elements is one kind of technology that realizes ultra-wideband transmission in a high frequency band, the massive MIMO technology having been extended from multiple-input multiple-output (MIMO) technology where a base station is assumed to have several tens of antenna elements.

A base station using massive MIMO forms beams having higher received power in a specific direction by beam forming (BF) using plural antenna elements. The base station transmits plural BF candidates (hereinafter, simply referred to as beams) determined beforehand and each applied to a downlink reference signal (a synchronization signal block: SSB). Each terminal reports an amount of received power for each beam measured from the downlink reference signal received. Based on the amount of received power from each terminal, the base station determines a beam to be applied to the terminal.

For example, in a base station having a central unit, such as a lower layer split central unit (lls-CU), and a distributed unit, such as a radio unit (RU), an xRAN fronthaul interface is specified between the central unit and the distributed unit. With this interface, the central unit controls beams of the distributed unit by using beam IDs. Specifically, the distributed unit notifies the central station of beam information that is information related to beams that are able to be formed by the distributed unit. The beam information has, for example, a beam ID that identifies a beam, a state of the beam, and an adjacent beam ID of a beam adjacent to the beam. The central unit selects a beam to be used for a user data signal, from beam IDs in the beam information notified by the distributed unit, and notifies the distributed unit of the selected beam.

For downlink MIMO transmission to be performed, a beam to be applied to a transmission signal of each MIMO layer needs to be selected. For example, for downlink transmission of two layers, a first beam and a second beam are selected as beams to be applied to the layers. The central unit selects, as the first beam and the second beam, two beams with the largest amounts of received power, from the amounts of received power of the beams reported from the terminals.

Patent Literature 1: Japanese Laid-open Patent Publication No. 2015-164281

However, when the central unit in the base station selects, as the first beam and the second beam, the two beams with the largest amounts of received power, from the beams, correlation between wireless channels for the beams to the terminals tends to become high. As a result, throughput is decreased due to interference between the first beam and the second beam as the correlation therebetween becomes high.

SUMMARY

According to an aspect of an embodiment, a base station device includes a central unit and a distributed unit. The distributed unit includes a first processor. The first processor is configured to form beams in plural directions by using plural antenna elements. The first processor is configured to transmit and receive a data signal addressed to a terminal device. The central unit includes a second processor. The second processor is configured to select a first beam and a second beam set, by using: relevant information on the beams, the relevant information being notified by the distributed unit that forms the beams; and reception quality of the beams in the terminal device. The second processor is configured to cause the distributed unit to transmit a reference signal by application of a beam group formed of: one or more beams in the second beam set; and the first beam. The second processor is configured to select a beam group to be applied to the data signal addressed to the terminal device, by using a reception state of the reference signal from the terminal device in a predetermined interval.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Preferred embodiments of the present invention will be explained with reference to accompanying drawings. Techniques disclosed herein are not limited by these embodiments. Furthermore, the following embodiments may be combined with one another as appropriate without any contradiction being caused thereby.

[a] First Embodiment

Figure 1:
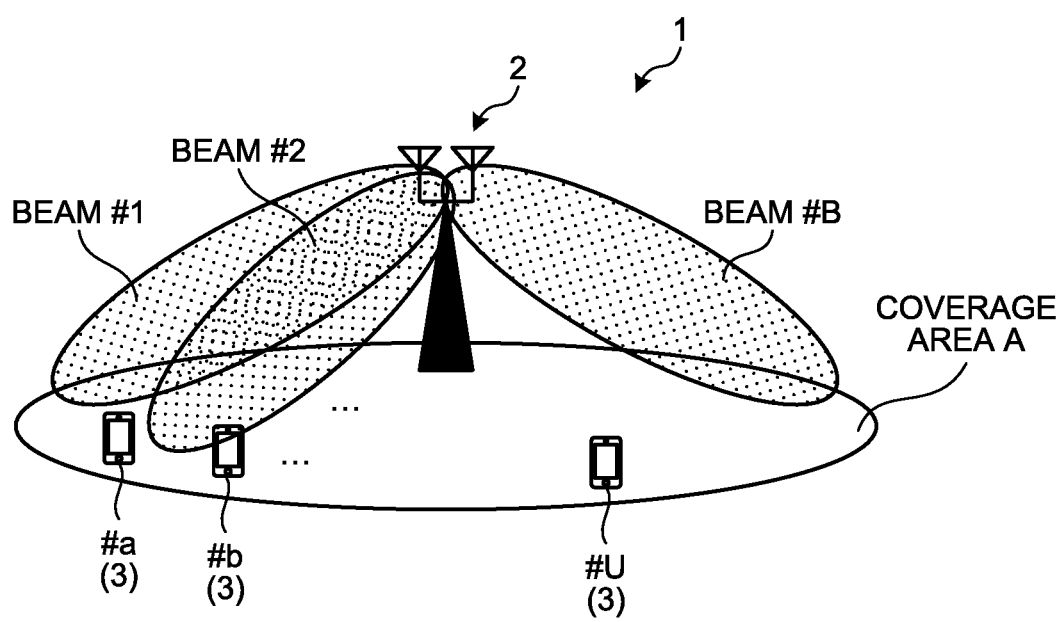
FIG. 1 is a diagram illustrating an example of a wireless system according to a first embodiment.

FIG. 1 is a diagram illustrating an example of a wireless system 1 according to a first embodiment. The wireless system 1 illustrated in FIG. 1 has a base station 2 and plural terminals 3. The base station 2 is a base station device that forms a coverage area A with plural beams #1, #2, . . . , #B, by using N antenna elements 15. Furthermore, the base station 2 wirelessly communicates with terminals 3 located in the coverage area A. Each of the terminals 3 is a terminal device, such as, for example, a smartphone, which wirelessly communicates with the base station 2. The terminals 3 are, for example, terminals #a, #b, . . . , U. The wireless system 1 is, for example, a Long Term Evolution (LTE) wireless system, or a new radio (NR) wireless system. The base station 2 time-multiplexes, frequency-multiplexes, code-multiplexes, or space-multiplexes a data signal, a synchronization signal, or a reference signal, and transmits the multiplexed signal to each terminal 3, by using the antenna elements 15.

Figure 2:
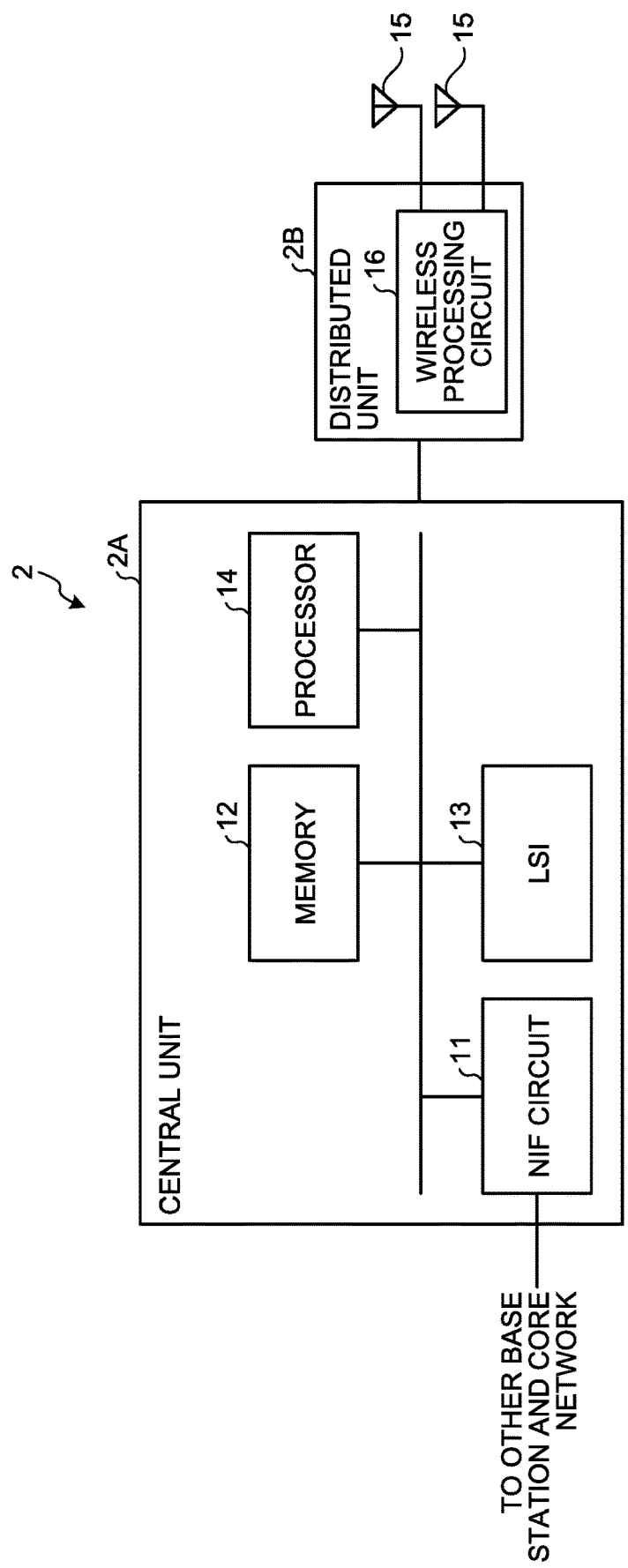
FIG. 2 is a block diagram illustrating an example of a hardware configuration of a base station according to the first embodiment.

FIG. 2 is a block diagram illustrating an example of a hardware configuration of the base station 2 according to the first embodiment. The base station 2 illustrated in FIG. 2 has a central unit 2A and a distributed unit 2B. The central unit 2A is, for example, an lls-CU that controls the distributed unit 2B. The distributed unit 2B is, for example, an RU that wirelessly communicates with the terminals 3 by using the plural antenna elements 15. The central unit 2A and the distributed unit 2B are connected to each other according to, for example, specifications of an xRAN fronthaul interface.

The central unit 2A has a network interface (NIF) circuit 11, a memory 12, a large scale integration (LSI) 13, and a processor 14. The NIF circuit 11 is an IF circuit that controls wired communication with a core network connected to another base station 2. The memory 12 is a device that stores therein various types of information. The LSI 13 is a circuit that executes various types of control. The processor 14 controls the whole central unit 2A. The distributed unit 2B has the plural antenna elements 15 and a wireless processing circuit 16. The wireless processing circuit 16 is an IF circuit that controls wireless communication with the terminals 3 through the antenna elements 15.

Figure 3:
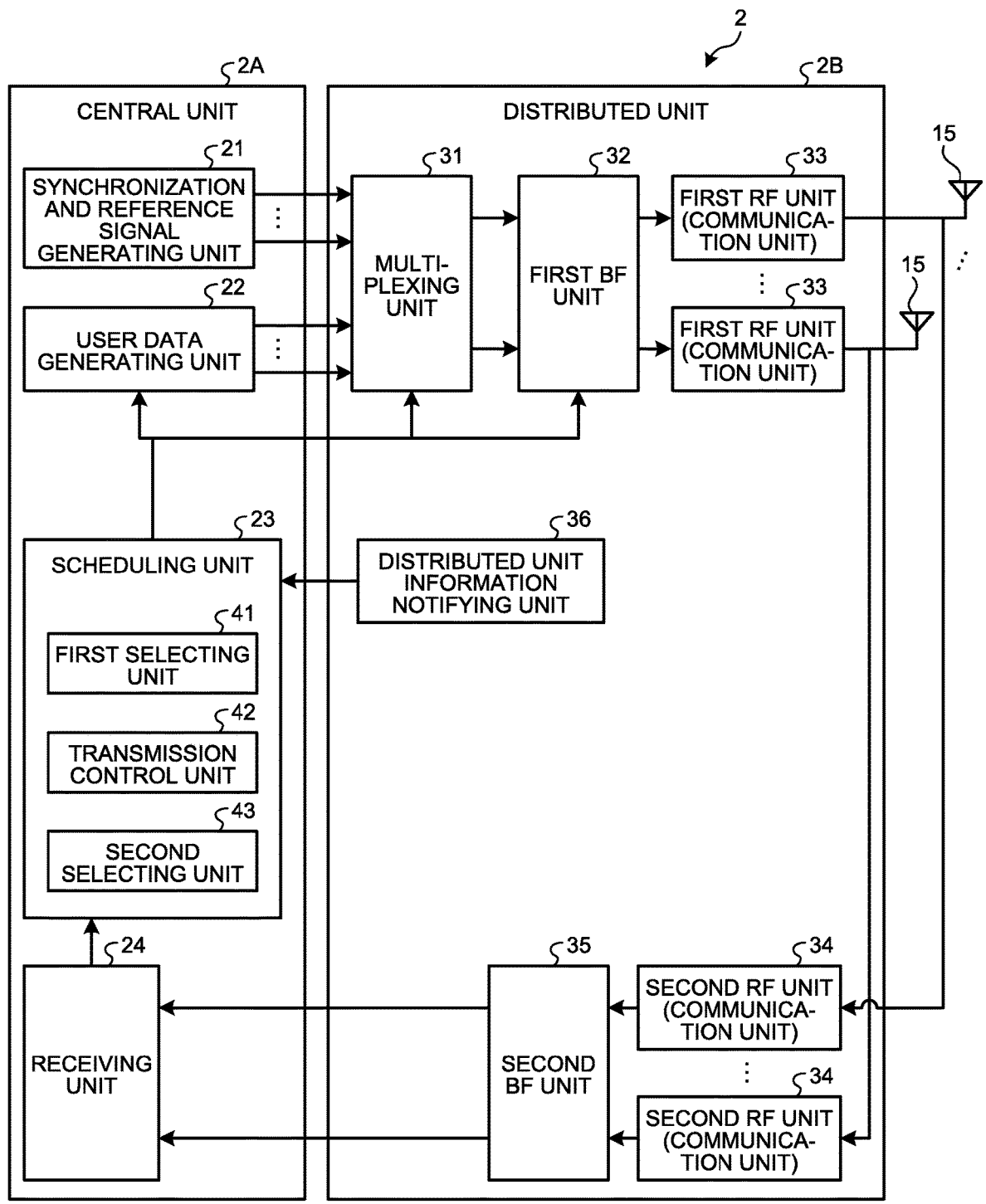
FIG. 3 is a block diagram illustrating an example of a functional configuration of the base station according to the first embodiment.

FIG. 3 is a block diagram illustrating an example of a functional configuration of the base station 2 according to the first embodiment. The central unit 2A in the base station 2 functions as a synchronization and reference signal generating unit 21, a user data generating unit 22, a scheduling unit 23, and a receiving unit 24, by executing, for example, a program stored in the memory 12. Furthermore, the distributed unit 2B in the base station 2 has the wireless processing circuit 16, and the wireless processing circuit 16 has a multiplexing unit 31, a first beam forming (BF) unit 32, plural first radio frequency (RF) units 33, plural second RF units 34, a second BF unit 35, and a distributed unit information notifying unit 36.

The synchronization and reference signal generating unit 21 generates a reference signal or a synchronization signal, such as an SSB, for each of the plural terminals 3 in the coverage area A or for each of selected terminals 3. The user data generating unit 22 generates a data signal for each terminal 3 selected. The scheduling unit 23 selects, based on predetermined selection criteria, K terminals 3 in the coverage area A from the plural terminals 3. The predetermined selection criteria may be, for example, proportional fair criteria using channel response vectors estimated, or round robin criteria providing communication opportunity equally. According to the first embodiment, for convenience of explanation, the predetermined selection criteria are assumed to be, for example, round robin criteria.

The receiving unit 24 acquires reception states of beams of the terminals 3 from channel state information (CSI) feedback signals from U terminals 3. A reception state of a beam may be reference signal received power (L1-RSRP) or a channel quality indicator (CQI) measured by use of a reference signal. The receiving unit 24 may cause the terminals 3 to feed back reception states of all beams, or may specify reception states of x beams with the best L1-RSRP or CQIs and cause the terminals 3 to feed back the specified reception states. Furthermore, the receiving unit 24 may specify one or plural beam numbers and cause reception states corresponding to the beam number/numbers to be fed back.

The scheduling unit 23 notifies the multiplexing unit 31 in the distributed unit 2B of, for example, mapping information for symbols and subcarriers, and notifies the first BF unit 32 in the distributed unit 2B of, for example, beam application information including beam numbers identifying beams to be applied. Based on L1-RSRP from a CSI feedback signal for a first CSI report value and a second CSI report value from each terminal 3, the scheduling unit 23 specifies an optimum beam number for each terminal 3. The optimum beam number is a beam number that identifies a beam that is received by a relevant terminal 3 with optimum reception quality, among plural beams.

The scheduling unit 23 has a first selecting unit 41, a transmission control unit 42, and a second selecting unit 43. The first selecting unit 41 selects a first beam and a second beam set, by using beam information that is relevant information of each beam notified by the distributed unit 2B that forms the beam, and a first CSI report value representing reception quality of each beam in a terminal 3. The first beam is, for example, a beam with the maximum reception quality, and the second beam set is a set including a second beam candidate that is a beam other than the first beam and does not interfere with the first beam. The first CSI report value is information including an amount of received power for a synchronization signal of each beam for each terminal 3. The first selecting unit 41 selects, as the first beam, a beam with the maximum reception quality, refers to beam information of the first beam, and selects, as the second beam set, beams other than an adjacent beam that interferes with the first beam. The second beam set is a set including the second beam candidate.

The transmission control unit 42 causes the distributed unit 2B to transmit a reference signal by application of a beam group to the reference signal, the beam group being formed of: one or more beams in the second beam set; and the first beam. The transmission control unit 42 causes the distributed unit 2B to transmit the reference signal while sequentially selecting the second beam candidate/candidates that is/are one or more beams in the second beam set and changing a beam group or a group candidate formed of: the sequentially selected second beam candidate/candidates; and the first beam.

The second selecting unit 43 selects a beam group to be applied to a user data signal addressed to a relevant terminal 3 by using a second CSI report value that is a reception state of a reference signal from that terminal 3 in a predetermined interval. The second CSI report value is information, such as: a suitability rank (a rank indicator: RI); reception quality (a channel quality indicator: CQI); or a precoding matrix indicator (PMI), for the reference signal, to which the first beam and second beam candidates have been applied for each terminal 3. The predetermined interval is an interval periodically generated in, for example, a second beam search cycle. The second selecting unit 43 selects, as a beam group to be applied to a data signal addressed to a terminal 3, a beam group or a group candidate with the maximum CQI, from beams with the maximum RIs, by using the second CSI report values for the reference signal acquired in a second beam search cycle.

The multiplexing unit 31 space-multiplexes a synchronization signal, a reference signal, or a data signal for each terminal 3, with a different time or frequency resource. That is, based on mapping information from the central unit 2A, the multiplexing unit 31 maps the synchronization signal, reference signal, or data signal for each terminal 3, to a subcarrier. Based on beam application information from the central unit 2A, the first BF unit 32 applies a predetermined beam specified in the beam application information, to the synchronization signal, reference signal, or data signal for each terminal 3. The first RF units 33 are respectively provided for the antenna elements 15 for the respective beams, convert the synchronization signal, reference signal, or data signal, into a wireless signal, and transmit the wireless signal to each terminal 3 via the antenna elements 15 corresponding to predetermined beams. The second RF units 34 are respectively provided for the antenna elements 15 for the respective beams, and receive incoming wireless signals. The first RF units 33 and second RF units 34 are, for example, communication units.

The second RF units 34 each convert a received signal including a CSI feedback signal (a CSI report value) from a terminal 3, into a baseband signal. The second BF unit 35 applies a beam with the optimum reception quality, to the received signal from each terminal 3. The distributed unit information notifying unit 36 generates beam information (as seen in FIG. 4) for management of a beam state of each beam ID in association with an adjacent beam ID, and notifies the scheduling unit 23 in the central unit 2A, of the beam information generated.

Figures 4, 5:
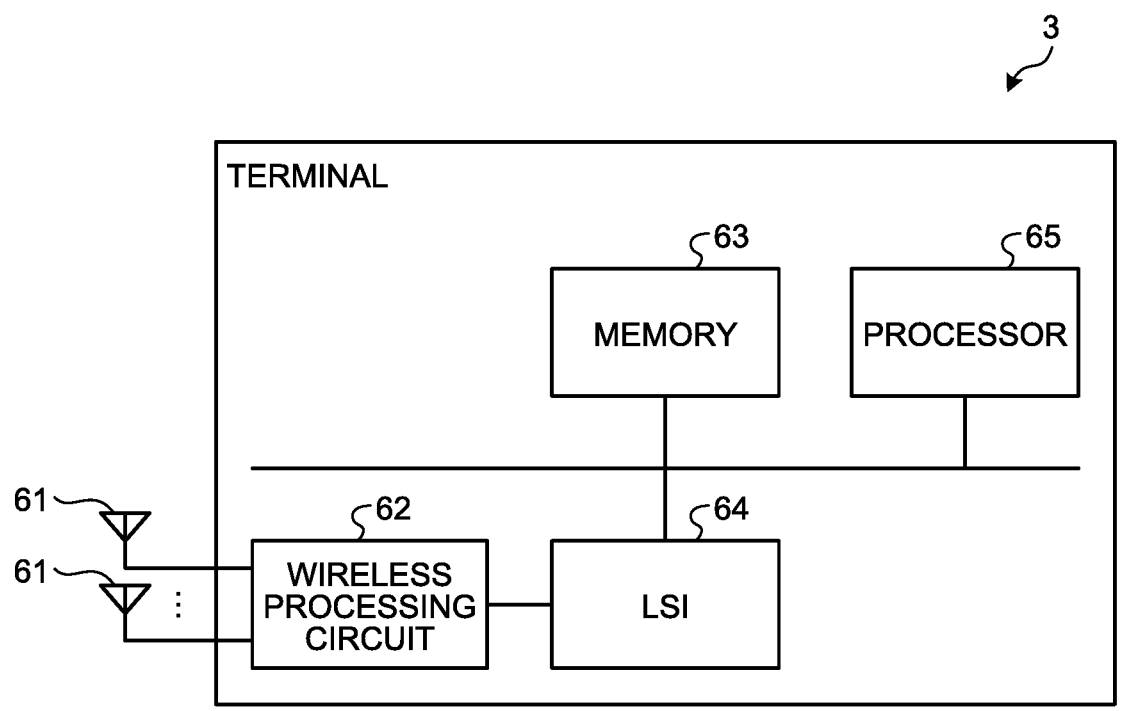
FIG. 4 is a diagram illustrating an example of beam information.
FIG. 5 is a block diagram illustrating an example of a hardware configuration of a terminal.

FIG. 4 is a diagram illustrating an example of beam information. Beam information 80 illustrated in FIG. 4 is for management of a beam state 80B and an adjacent beam ID 80C in association with each beam ID 80A. The beam ID 80A is an ID identifying a beam. The beam state 80B is information indicating a state of the beam, like, for example, whether directivity of the beam is of a wide beam, "coarse", or of a narrow beam, "fine". The adjacent beam ID 80C is an ID identifying another beam adjacent to the beam corresponding to the beam ID 80A. When the first selecting unit 41 in the scheduling unit 23 refers to the beam information 80 illustrated in FIG. 4, and selects, for example, a beam ID #2 as a beam ID of a first beam, from beam IDs #1 to #4, the first selecting unit 41 specifies the beam ID #1 as an adjacent beam ID corresponding to the beam ID #2. The first selecting unit 41 then selects, as a second beam set, a beam set of beams having the beam IDs #3 and #4, the beam set being a beam set excluding: the first beam having the beam ID #2; and an adjacent beam having the beam ID #1.

FIG. 5 is a block diagram illustrating an example of a hardware configuration of a terminal 3. The terminal 3 illustrated in FIG. 5 has plural antenna elements 61, a wireless processing circuit 62, a memory 63, an LSI 64, and a processor 65. The wireless processing circuit 62 is an IF circuit that controls wireless communication with the distributed unit 2B in the base station 2, through the antenna elements 61. The memory 63 is a device that stores therein various types of information. The LSI 64 is a circuit that executes various types of control. The processor 65 controls the whole terminal 3.

Figure 6:
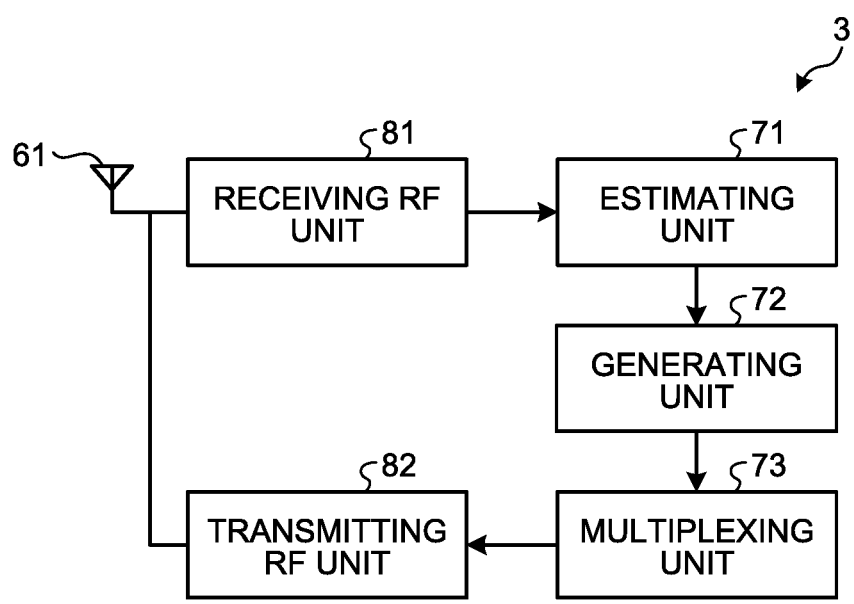
FIG. 6 is a block diagram illustrating an example of a functional configuration of the terminal.

FIG. 6 is a block diagram illustrating an example of a functional configuration of the terminal 3. The terminal 3 illustrated in FIG. 6 functions as an estimating unit 71, a generating unit 72, and a multiplexing unit 73, by executing, for example, a program stored in the memory 63. The wireless processing circuit 62 has a receiving RF unit 81 and a transmitting RF unit 82.

The receiving RF unit 81 receives a received signal including a synchronization signal or a reference signal from the distributed unit 2B in the base station 2 via the antenna elements 61, and converts the received signal received, into a baseband signal. The estimating unit 71 calculates reception states (L1-RSRP or CQIs) of B beams by using a synchronization signal or a reference signal, to which each beam is applied. The generating unit 72 performs, for example, coding and modulation of a first CSI report value, a second CSI report value, and information thereon.

The multiplexing unit 73 multiplexes, for example, a feedback signal for a first CSI report value or a second CSI report value, into a frequency resource assigned thereto. The transmitting RF unit 82 converts the multiplexed feedback signal into a wireless signal, and transmits the converted wireless signal via the antenna elements 61. As a result, the receiving unit 24 in the central unit 2A in the base station 2 demodulates the feedback signal (the first CSI report value or second CSI report value) from the terminal 3 through the distributed unit 2B. The scheduling unit 23 in the central unit 2A is able to acquire the first CSI report value or second CSI report value notified by the terminal 3.

Figure 7:
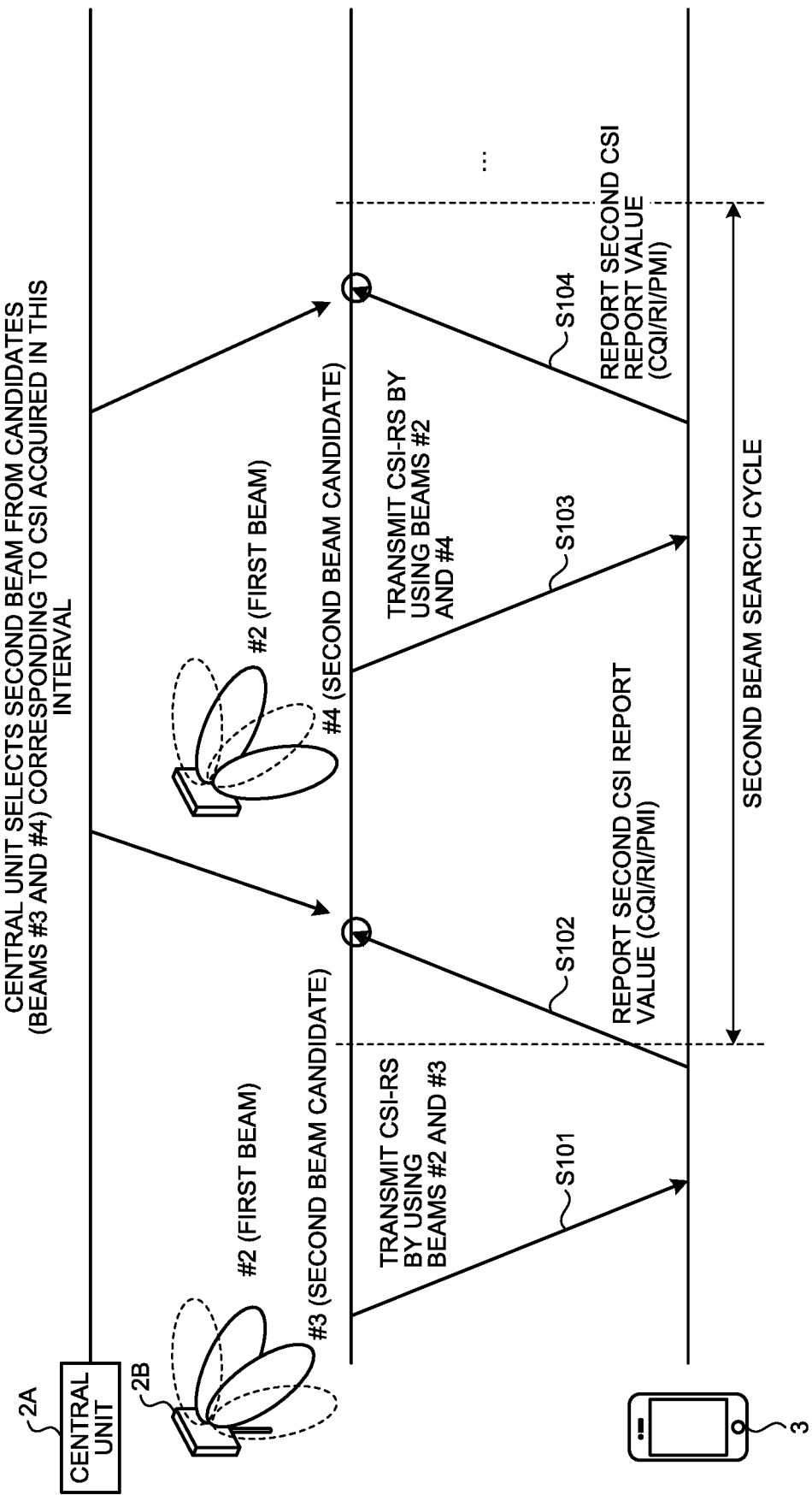
FIG. 7 is a diagram illustrating an example of operation in processing by the base station and the terminal related to a beam group selecting process.

Described next is operation of the wireless system 1 according to the first embodiment. FIG. 7 is a diagram illustrating an example of operation in processing by the base station 2 and the terminal 3 related to a beam group selecting process. The central unit 2A in the base station 2 performs narrowing to determine a first beam and a second beam set by using the beam information from the distributed unit 2B and first CSI report values of each terminal 3. For convenience of explanation, the first beam is assumed to have the beam ID #2 and the second beam set is assumed to include the beams having the beam IDs #3 and #4. The central unit 2A notifies the distributed unit 2B of a transmission instruction for a reference signal (CSI-RS), to which the first beam #2 and the second beam candidate #3 have been applied. The distributed unit 2B transmits the reference signal (CSI-RS), to which the first beam #2 and the second beam candidate #3 have been applied, to the terminal 3, according to the transmission instruction (Step S101). The terminal 3 generates a second CSI report value (CQI/RI/PMI) for the reference signal, to which the first beam #2 and the second beam candidate #3 have been applied, and transmits the second CSI report value that has been generated, to the distributed unit 2B (Step S102). Furthermore, the distributed unit 2B notifies the central unit 2A of the second CSI report value.

Furthermore, the central unit 2A notifies the distributed unit 2B of a transmission instruction for a reference signal (CSI-RS), to which the first beam #2 and the second beam candidate #4 have been applied. The distributed unit 2B transmits the reference signal (CSI-RS), to which the first beam #2 and the second beam candidate #4 have been applied, to the terminal 3, according to the transmission instruction (Step S103). The terminal 3 generates a second CSI report value (CQI/RI/PMI) for the reference signal, to which the first beam #2 and the second beam candidate #4 have been applied, and transmits the second CSI report value that has been generated, to the distributed unit 2B (Step S104). Furthermore, the distributed unit 2B notifies the central unit 2A of the second CSI report value.

The central unit 2A selects an optimum second beam from second CSI report values for each group candidate collected per periodic second beam search cycle. That is, by repeatedly executing the processing from the generation of a reference signal to the selection of a second beam in a second beam search cycle, the central unit 2A selects a suitable beam group from all or a part of beam groups supposed (those, for which second CSI report values have been acquired in the second beam search cycle).

Figure 8:
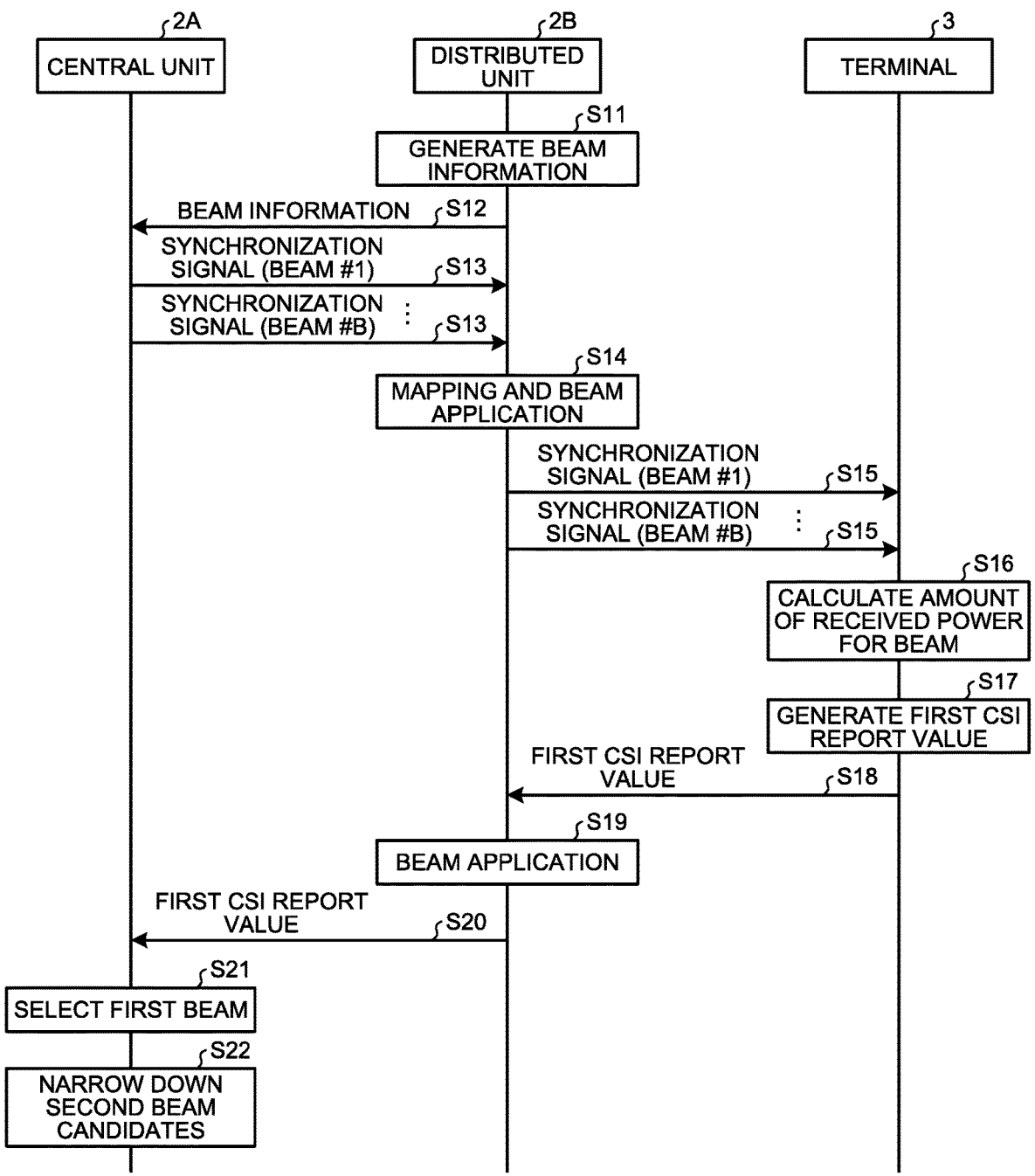
FIG. 8 is a sequence diagram illustrating an example of operation in processing by the base station and the terminal related to the beam group selecting process.
Figure 9:
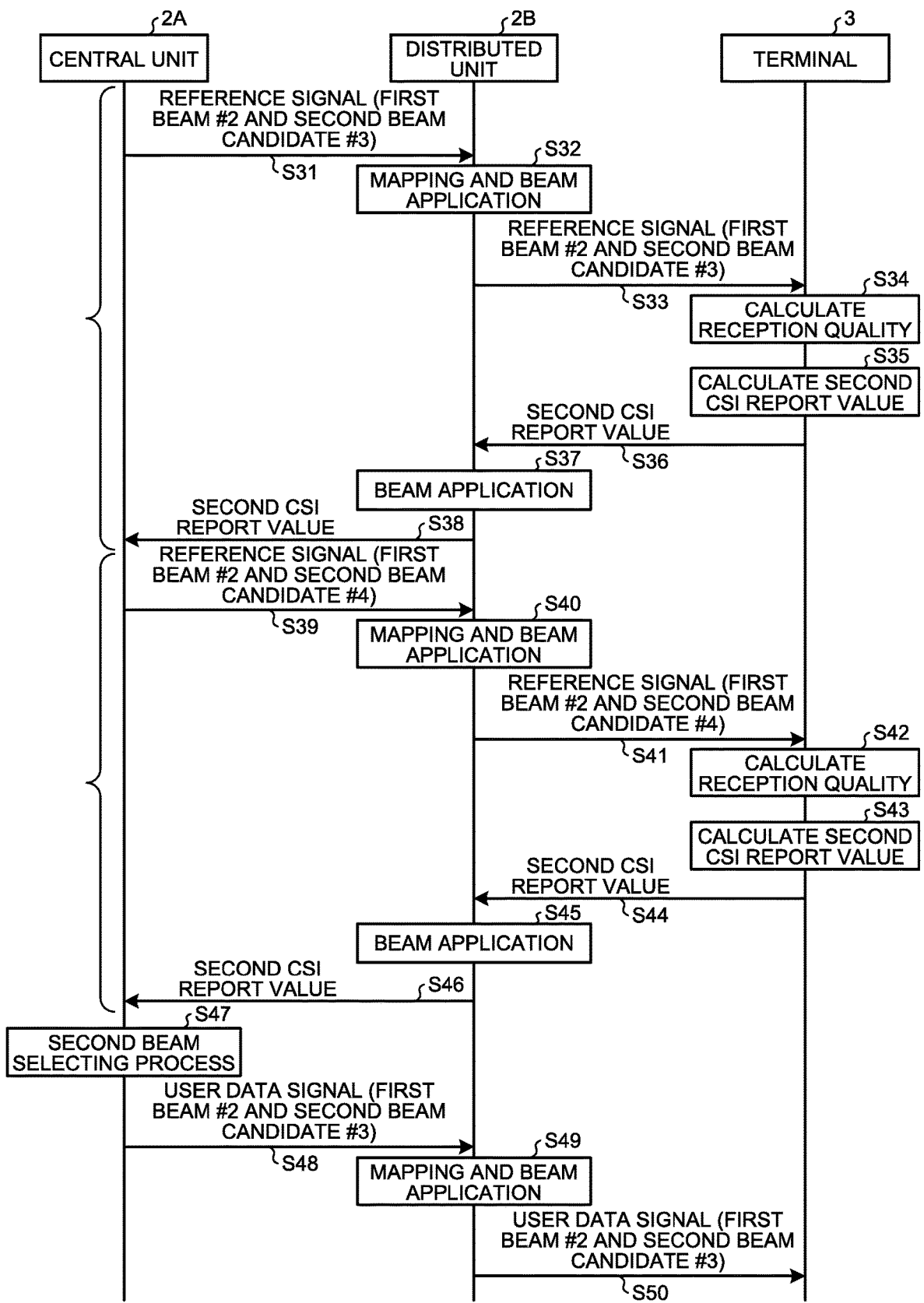
FIG. 9 is a sequence diagram illustrating an example of operation in processing by the base station and the terminal related to the beam group selecting process.

FIG. 8 and FIG. 9 are sequence diagrams illustrating an example of operation in processing by the base station 2 and the terminal 3 related to the beam group selecting process. The distributed unit information notifying unit 36 in the distributed unit 2B generates the beam information for management of a beam state and an adjacent beam ID for each beam ID (Step S11). The distributed unit information notifying unit 36 notifies the central unit 2A of the beam information generated (Step S12). As a result, the central unit 2A is able to recognize the beam state and the adjacent beam of each beam, for each terminal 3.

The scheduling unit 23 in the central unit 2A refers to the beam information, sequentially changes the beam ID to be applied to a synchronization signal, and notifies the distributed unit 2B of beam application information and the synchronization signal for each beam (Step S13). The multiplexing unit 31 in the distributed unit 2B maps the synchronization signal for each beam to a subcarrier, based on mapping information. Furthermore, a first BF unit 26 in the distributed unit 2B applies a predetermined beam to a synchronization signal, based on the beam application information (Step S14). The first RF unit 33 in the distributed unit 2B transmits the synchronization signal for each beam, to a terminal 3 (Step S15).

The estimating unit 71 in the terminal 3 calculates the amount of received power for the synchronization signal for each beam, from the synchronization signal of the beam (Step S16). Based on the amount of received power for each beam, the generating unit 72 in the terminal 3 generates a first CSI report value (Step S17). The first CSI report value is information on reception quality, the information including the amount of received power for the synchronization signal for each beam. Furthermore, the multiplexing unit 73 in the terminal 3 multiplexes the first CSI report value into a frequency resource assigned thereto. The transmitting RF unit 82 in the terminal 3 converts the first CSI report value that has been multiplexed, into a wireless signal, and transmits the wireless signal to the distributed unit 2B via the antenna elements 61 (Step S18).

The second RF unit 34 in the distributed unit 2B converts the wireless signal including the first CSI report value from the terminal 3, into a baseband signal. The second BF unit 35 in the distributed unit 2B applies a beam notified by the central unit 2A, to a received signal from the terminal 3 (Step S19). As a suitable beam for the terminal 3, a beam number with the maximum amount of received power included in the first CSI report value from the terminal up to that time point is used. The second BF unit 35 notifies the central unit 2A of the first CSI report value received from each terminal 3 (Step S20).

The receiving unit 24 in the central unit 2A receives the first CSI report value from the distributed unit 2B. Based on the amount of received power for each beam in the first CSI report value received, the first selecting unit 41 in the central unit 2A selects, as a first beam, a beam with the maximum amount of received power (Step S21). The first selecting unit 41 selects, as the first beam, the beam with the maximum amount of received power, from amounts of received power in the latest first CSI report values received. However, this may be modified as appropriate, and the first selecting unit 41 may select, as the first beam, for example, a beam with the maximum received power, from amounts of received power, each of which is an average of plural first CSI report values that are: the latest first CSI report value; and one first CSI report value before the latest first CSI report value.

After selecting the first beam, the first selecting unit 41 determines by narrowing, based on the first CSI report values and beam information for each terminal 3, a second beam set (Step S22), and ends the operation in the processing illustrated in FIG. 8. That is, the first selecting unit 41 extracts the amount of received power of each beam in the first CSI report values of each terminal 3. Furthermore, the first selecting unit 41 selects, based on the extracted amounts of received power and the beam information, a second beam set that is beams other than a beam adjacent to the first beam, from a beam set excluding the first beam. For convenience of explanation, when applicable beams are beams #1 to #4, the first beam is the beam #2, and a beam adjacent to the beam #2 is the beam #1, the second beam set is the beams #3 and #4.

For convenience of explanation, the case, in which the central unit 2A acquires the first CSI report values including the amounts of received power of all of the beams for a terminal 3, has been described as an example. However, this may be modified as appropriate, and first CSI report values including amounts of received power of X beams having the largest amounts of received power may be acquired, or first CSI report values including amounts of received power may be acquired by specification of one or more beam numbers.

After selecting the first beam and the second beam set, the transmission control unit 42 in the central unit 2A illustrated in FIG. 9 notifies the distributed unit 2B of group candidate information on the first beam #2 and the second beam candidate #3, a reference signal (CSI-RS), and mapping information (Step S31). The synchronization and reference signal generating unit 21 generates a reference signal of two antenna ports, to which the first beam #2 and the second beam candidate #3 are applied. After receiving the reference signal and the mapping information, the multiplexing unit 31 in the distributed unit 2B maps the reference signal of each terminal 3 into a subcarrier, based on the mapping information. Furthermore, based on the group candidate information, the first BF unit 26 in the distributed unit 2B applies the first beam #2 and the second beam candidate #3 to the reference signal of each terminal 3 (Step S32).

The first RF unit 33 in the distributed unit 2B transmits the reference signal of the first beam #2 and second beam candidate #3 to each terminal 3 (Step S33). When the estimating unit 71 in each terminal 3 receives the reference signal, the estimating unit 71 calculates an amount of reception quality for the reference signal received (Step S34). The amount of reception quality for the reference signal includes, for example, an RI, a CQI, or a PMI. After calculating the amount of reception quality for the reference signal of the first beam #2 and second beam candidate #3, the generating unit 72 in each terminal 3 generates, based on the amount of reception quality, a second CSI report value for the reference signal of the first beam #2 and second beam candidate #3 (Step S35). The multiplexing unit 73 in each terminal 3 multiplexes the second CSI report value into a frequency resource assigned thereto. The transmitting RF unit 82 in the terminal 3 converts the second CSI report value that has been multiplexed, into a wireless signal, and transmits the wireless signal to the distributed unit 2B via the antenna elements 61 (Step S36).

The second RF unit 34 in the distributed unit 2B converts the wireless signal including the second CSI report value from the terminal 3, into a baseband signal. The second BF unit 35 in the distributed unit 2B applies a beam notified by the central unit 2A to a received signal from the terminal 3 (Step S37). The beam applied at Step S37 is, for example, the first beam. The second BF unit 35 notifies the central unit 2A of the second CSI report value for the first beam #2 and the second beam candidate #3, for each terminal 3 (Step S38).

Furthermore, when there is group candidate information that has not been specified yet, the transmission control unit 42 in the central unit 2A notifies the distributed unit 2B of the unspecified group candidate information, a reference signal, and mapping information. The transmission control unit 42 notifies the distributed unit 2B of, for example, group candidate information, a reference signal, and mapping information, which have not been transmitted yet, for the first beam #2 and the second beam candidate #4 (Step S39). The synchronization and reference signal generating unit 21 generates a reference signal of two antenna ports, to which the first beam #2 and second beam candidate #4 are to be applied. After receiving the reference signal and mapping information, the multiplexing unit 31 in the distributed unit 2B maps the reference signal for each terminal 3 into a subcarrier, based on the mapping information. Furthermore, based on the group candidate information, the first BF unit 26 in the distributed unit 2B applies the first beam #2 and the second beam candidate #4 to the reference signal for each terminal 3 (Step S40).

The first RF unit 33 in the distributed unit 2B transmits the reference signal of the first beam #2 and second beam candidate #4 to each terminal 3 (Step S41). When the estimating unit 71 in each terminal 3 receives the reference signal, the estimating unit 71 calculates an amount of reception quality for the reference signal of the first beam #2 and second beam candidate #4 (Step S42). After calculating the amount of reception quality for the reference signal of the first beam #2 and second beam candidate #4, the generating unit 72 in each terminal 3 generates, based on the amount of reception quality, a second CSI report value for the reference signal of the first beam #2 and second beam candidate #4 (Step S43). The multiplexing unit 73 in each terminal 3 multiplexes the second CSI report value into a frequency resource assigned thereto. The transmitting RF unit 82 in the terminal 3 converts the second CSI report value that has been multiplexed, into a wireless signal, and transmits the wireless signal to the distributed unit 2B via the antenna elements 61 (Step S44).

The second RF unit 34 in the distributed unit 2B converts the wireless signal including the second CSI report value from the terminal 3, into a baseband signal. The second BF unit 35 in the distributed unit 2B applies a beam notified by the central unit 2A, to a received signal from the terminal 3 (Step S45). The beam applied at Step S45 is, for example, the first beam. For each terminal 3, the second BF unit 35 notifies the central unit 2A of the second CSI report value of the first beam #2 and second beam candidate #4 (Step S46).

When the second selecting unit 43 in the central unit 2A receives the second CSI report value for the reference signal of the first beam #2 and second beam candidate #4, the second selecting unit 43 executes a second beam selecting process of selecting a second beam from the second beam set #3 and #4 (Step S47). When the second selecting unit 43 selects, for example, the second beam #3 in the second beam selecting process, the second selecting unit 43 generates group information on the first beam #2 and second beam #3, mapping information, and a user data signal, and notifies the distributed unit 2B of the group information, the mapping information, and the user data signal (Step S48).

The user data generating unit 22 generates, based on the group information, a user data signal for two antenna ports, to which the first beam #2 and second beam #3 are applied. The number of user data signals generated by the user data generating unit 22 is the number of layers corresponding to an RI in the second CSI report value of the first beam and second beam selected by the second selecting unit 43. Furthermore, the user data generating unit 22 applies precoding corresponding to a PMI in the second CSI report value of the first beam and second beam selected by the second selecting unit 43, and transfers mapping information for symbols and subcarriers, together with beam IDs to be applied to layers (the first beam and the second beam), to the distributed unit 2B.

After receiving the user data signal and the mapping information, the multiplexing unit 31 in the distributed unit 2B maps the user data signal for each terminal 3 to a subcarrier, based on the mapping information. Moreover, based on group information, the first BF unit 26 in the distributed unit 2B applies the first beam #2 and second beam #3 to the user data signal (Step S49).

The first RF unit 33 in the distributed unit 2B transmits the user data signal to the terminal 3 by using the first beam #2 and second beam #3 applied thereto (Step S50), and ends the operation in the processing illustrated in FIG. 9.

Figure 10:
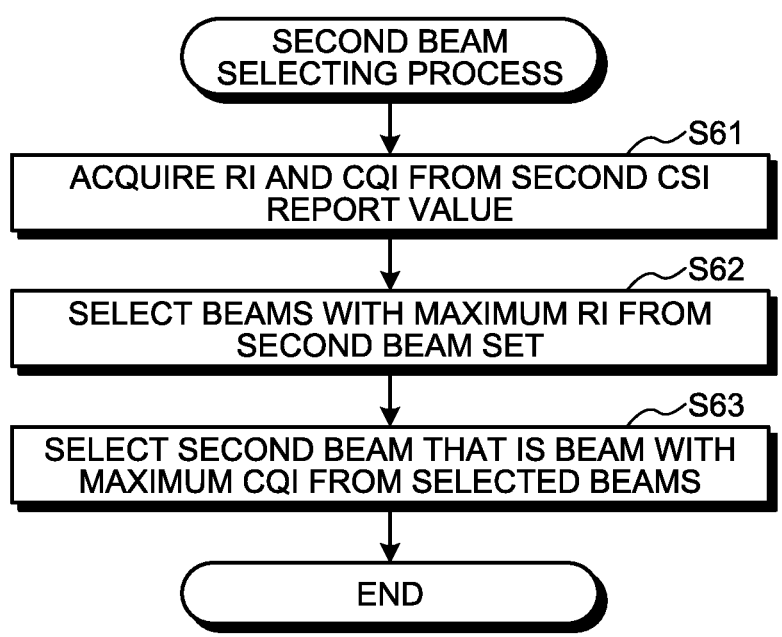
FIG. 10 is a flow diagram illustrating an example of operation in processing by a central unit related to a second beam selecting process.

FIG. 10 is a flow diagram illustrating an example of operation in processing by the central unit 2A related to the second beam selecting process. The second selecting unit 43 in the central unit 2A acquires an RI and a CQI in each second CSI report value in a second beam search cycle (Step S61).

The second selecting unit 43 selects beams with the maximum RIs from a second beam set (Step S62), selects a second beam that is a beam with the maximum CQI, from the selected beams with the maximum RIs (Step S63), and ends the operation in the processing illustrated in FIG. 10.

The central unit 2A in the base station 2 according to the first embodiment selects a first beam and a second beam set, by using beam information notified by the distributed unit 2B and reception quality (first CSI report values) of beams in a terminal 3. Furthermore, the central unit 2A causes the distributed unit 2B to transmit a reference signal (CSI-RS) by application of a beam group formed of: one or more beams in the second beam set; and the first beam. Moreover, the central unit 2A selects a beam group to be applied to a user data signal addressed to the terminal 3 by using a reception state (a second CSI report value) of the reference signal from the terminal in a second beam search cycle. As a result, the central unit 2A enables throughput in MIMO transmission to be improved.

In the base station 2, even if the central unit 2A and the distributed unit 2B are of different vendors, the central unit 2A is able to select an optimum beam group with the specifications of the xRAN fronthaul interface, without change in specifications of the distributed unit 2B. That is, the central unit 2A acquires beam information and first CSI report values from the distributed unit 2B, and refers to the acquired beam information and first CSI report values. As a result, even if the distributed unit 2B and the central unit 2A are of different vendors, a beam group of a first beam and a second beam is able to be selected efficiently.

The central unit 2A selects a beam with the maximum reception quality as a first beam, refers to an adjacent beam ID in beam information of the first beam, and selects a second beam set that is a beam set of beams other than a beam that interferes with the first beam. As a result, by narrowing down plural beams to the second beam set, the central unit 2A is able to shorten the feedback time, in which the second CSI report values for the reference signal are received.

By using reception states (second CSI report values) of a reference signal in a second beam search cycle, the central unit 2A selects a beam group to be applied to a user data signal addressed to a terminal 3, the beam set corresponding to a reception state with the maximum CQI, among reception states with the maximum RIs. As a result, the central unit 2A is able to efficiently select a combination of beams having high quality and low channel correlation in MIMO transmission.

The central unit 2A sequentially selects one or more beams in a second beam set, and causes the distributed unit 2B to transmit a reference signal while changing a beam group formed of: the beam/beams sequentially selected; and a first beam. As a result, by recognizing a reception state for the reference signal of each group candidate, the central unit 2A is able to select an optimum beam group.

The case, in which the first selecting unit 41 according to the first embodiment narrows down beams to a second beam set by using beam information and first CSI report values notified by the distributed unit 2B, has been described as an example, but the disclosed techniques are not limited to this example. Described hereinafter as a second embodiment is thus another embodiment not limited to that example. By assignment of the same reference signs to components that are the same as those of the wireless system 1 according to the first embodiment, description of the same components and operation thereof will be omitted.

[b] Second Embodiment

By using beam information, a first selecting unit 41 according to a second embodiment selects, from B beams #1, #2, #3, #4, #5, and #6, a beam set (the beams #3, #4, #5, and #6) excluding: a first beam (the beam #2) of a relevant terminal 3; and an adjacent beam (the beam #1) that the first beam interferes with. Furthermore, the first selecting unit 41 extracts an amount of received power of each beam from first CSI report values. Moreover, the first selecting unit 41 selects, from the beam set selected, a second beam set that is a beam set (for example, the beams #3, #4, and #5), in which each beam has an amount of received power with a difference equal to or less than a predetermined value from the amount of received power of the first beam.

When transmitting a reference signal, a transmission control unit 42 according to the second embodiment selects, in order, a second beam candidate that is a beam having a large amount of received power, from the selected second beam set. The transmission control unit 42 causes a distributed unit 2B according to the second embodiment to transmit the reference signal, to which a second beam candidate selected in order and the first beam have been applied.

Next, a second selecting unit 43 according to the second embodiment acquires, from the distributed unit 2B, a second CSI report value for the reference signal, to which the second beam candidate selected in order and the first beam have been applied. When an RI in the second CSI report value is equal to or larger than a predetermined value, the second selecting unit 43 selects, as a second beam, the second beam candidate corresponding to that second CSI report value. The predetermined value may be the maximum number of layers that are able to be transmitted from the distributed unit 2B, or the minimum number of layers needed for a predetermined transmission speed to be achieved. Furthermore, for second beam candidates thereafter (with values of received power equal to or less that that of the second beam), transmission of the reference signal may be stopped. On the contrary, when RIs in the second CSI report values corresponding to all of the second beam candidates are less than the maximum number of layers that are able to be transmitted from the distributed unit 2B, the second beam candidate of a beam group having the maximum CQI in the second CSI report values is selected as the second beam, from those with the largest RIs in the second CSI report values.

A central unit 2A according to the second embodiment refers to a reception state (a second CSI report value) transmitted by application of a beam group, and selects a beam group to be applied to a user data signal addressed to a terminal 3, the beam group being a beam group having an RI in a reception state thereof, the RI being equal to or larger than a predetermined value. As a result, when the RI is equal to or larger than the predetermined value, the beams are usable, and the central unit 2A is thus able to select a beam group promptly regardless of its optimality.

The first selecting unit 41 according to the first embodiment selects a beam group formed by a single distributed unit 2B, but a beam group formed by plural distributed units, for example, two distributed units 2B1 and 2B2, may be selected, and such an embodiment will be described hereinafter as a third embodiment.

[c] Third Embodiment

Figure 11:
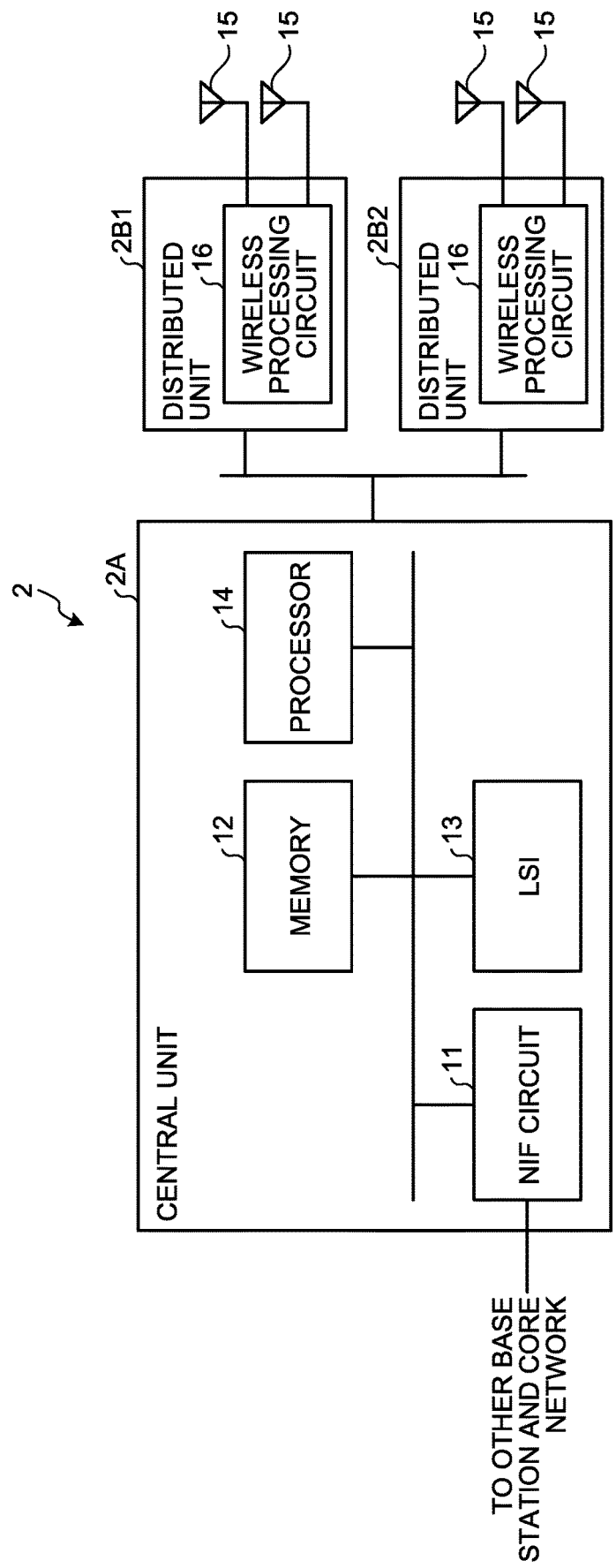
FIG. 11 is a block diagram illustrating an example of a hardware configuration of a base station according to a third embodiment.

FIG. 11 is a block diagram illustrating an example of a hardware configuration of a base station 2 according to a third embodiment. By assignment of the same reference signs to components that are the same as those of the wireless system 1 according to the first embodiment, description of the same components and operation thereof will be omitted.

The base station 2 illustrated in FIG. 11 has a central unit 2A according to the third embodiment, and the two distributed units 2B1 and 2B2. The two distributed units 2B1 and 2B2 each form B/2 beams, and form together a coverage area with a total of B beams. For convenience of explanation, the distributed unit 2B1 forms, for example, four beams #a1, #a2, #a3, and #a4. The distributed unit 2B2 forms, for example, four beams #b1, #b2, #b3, and #b4.

A first selecting unit 41 according to the third embodiment selects a first beam that is a beam having the maximum received power acquired from first CSI report values. Described herein for convenience of explanation is a case, in which a beam formed by the distributed unit 2B1 is selected as the first beam.

The first selecting unit 41 narrows the B beams formed by the distributed units 2B1 and 2B2, to a second beam set including second beam candidates. In this narrowing, by using beam information of the distributed units 2B1 and 2B2, the first selecting unit 41 selects, from the B beams (the beams #a1, #a2, #a3, #a4, #b1, #b2, #b3, and #b4), the second beam set (the beams #a3, #a4, #b1, #b2, #b3, and b4) excluding the first beam (the beam #a2) of a relevant terminal 3 and a beam (the beam #a1) that the first beam interferes with.

A transmission control unit 42 according to the third embodiment causes the distributed units 2B1 and 2B2 to each transmit a reference signal to which a beam group has been applied, the beam group being formed of: one or more beams in the second beam set; and the first beam (the beam #a2). A second selecting unit 43 according to the third embodiment selects a beam group to be applied to a user data signal addressed to the terminal 3 by using a second CSI report value for the reference signal from the terminal 3 in a second beam search cycle.

The central unit 2A in the base station 2 according to the third embodiment enables throughput in MIMO transmission to be improved even if there is more than one distributed unit 2B.

The case, in which, when the first selecting unit 41 according to the third embodiment selects a beam of the distributed unit 2B1 as a first beam, the first selecting unit 41 selects, as a second beam, a beam other than a beam that interferes with the first beam, from a beam set of the distributed units 2B1 and 2B2, has been described as an example. However, this may be modified as appropriate, and when the first selecting unit 41 selects a beam of the distributed unit 2B1 as a first beam, the first selecting unit 41 may select, as a second beam, a beam other than a beam that interferes with the first beam, from a beam set of the distributed unit 2B2 instead of the distributed unit 2B1.

Furthermore, for convenience of explanation, the scheduling unit 23 according to the first embodiment has been described to select K terminals, for example, two terminals, but without being limited to two, the number of terminals selected may be one, three, or more, and may be modified as appropriate.

According to an embodiment, throughput is able to be improved.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A base station device comprising: a central unit; and a distributed unit, wherein
the distributed unit includes a first processor configured to:
form beams in plural directions by using plural antenna elements; and transmit and receive a data signal addressed to a terminal device, and
the central unit includes a second processor configured to:
select a first beam and a second beam set, by using: relevant information on the beams, the relevant information being notified by the distributed unit that forms the beams; and reception quality of the beams in the terminal device;
cause the distributed unit to transmit a reference signal by application of a beam group formed of: one or more beams in the second beam set; and the first beam; and
select a beam group to be applied to the data signal addressed to the terminal device, by using a reception state of the reference signal from the terminal device in a predetermined interval.

2. The base station device according to claim 1, wherein the second processor is further configured to select, as the first beam, a beam with a maximum reception quality, refer to relevant information on the first beam, and select, as the second beam set, a beam set excluding a beam that interferes with the first beam.

3. The base station device according to claim 1, wherein the second processor is further configured to select the beam group to be applied to the data signal addressed to the terminal device, by using the reception state of the reference signal in the predetermined interval, the beam group being a beam group corresponding to a reception state with a maximum reception quality included in reception states with a maximum suitability rank included in reception states.

4. The base station device according to claim 1, wherein the second processor is further configured to refer to the reception state of the reference signal transmitted by application of the beam group, and select the beam group to be applied to the data signal addressed to the terminal device, the beam group being a beam group having a suitability rank included in the reception state, the suitability rank being equal to or larger than a predetermined value.

5. The base station device according to claim 1, wherein the second processor is further configured to sequentially select one or more beams in the second beam set, and cause the distributed unit to transmit the reference signal while changing the beam group formed of: the beam/beams sequentially selected; and the first beam.

6. A beam selecting method comprising:
forming, by using a distributed unit of a base station device, beams in plural directions by using plural antenna elements and transmitting and receiving a data signal addressed to a terminal device;
selecting, by using a central unit of the base station device, a first beam and a second beam set, by using: relevant information on the beams, the relevant information being notified by the distributed unit that forms the beams; and reception quality of the beams in the terminal device;
causing, by using the central unit, the distributed unit to transmit a reference signal by application of a beam group formed of: one or more beams in the second beam set; and the first beam; and
selecting, by using the central unit, a beam group to be applied to the data signal addressed to the terminal device, by using a reception state of the reference signal from the terminal device in a predetermined interval.

* * * * *